US007305009B2

United States Patent
Gaskill

(10) Patent No.: US 7,305,009 B2
(45) Date of Patent: Dec. 4, 2007

(54) METHOD TO PROVIDE BACKWARD COMPATIBILITY WITH AN EXISTING CSMA/CA SYSTEM VIA DUAL USE OF THE NEW SYSTEM'S TRANSMISSION TRANSITION GUARD SLOT INTERVAL

(75) Inventor: Garold B. Gaskill, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 771 days.

(21) Appl. No.: 10/778,720

(22) Filed: Feb. 12, 2004

(65) Prior Publication Data

US 2005/0180453 A1 Aug. 18, 2005

(51) Int. Cl.
*H04J 3/16* (2006.01)
(52) U.S. Cl. .................. 370/470; 370/469; 370/442
(58) Field of Classification Search ........ 370/442–448, 370/465–472, 478
See application file for complete search history.

(56) References Cited

U.S. PATENT DOCUMENTS 6,987,770 B1* 1/2006 Yonge, III .................. 370/401
2003/0156603 A1  8/2003 Rakib et al.
2006/0198387 A1* 9/2006 Yonge et al. ............... 370/437
2007/0047510 A1* 3/2007 Cho et al. .................. 370/338
2007/0097960 A1* 5/2007 Kurobe et al. .............. 370/352

FOREIGN PATENT DOCUMENTS

EP  0622712 B1  6/2003

* cited by examiner

*Primary Examiner*—Chi Pham
*Assistant Examiner*—Thai Hoang
(74) *Attorney, Agent, or Firm*—David C. Ripma

(57) ABSTRACT

A method of providing backwards compatibility of a new TDMA system with an existing CSMA/CA system, wherein the CSMA/CA system includes asynchronous packet transmission, and wherein the TDMA system includes synchronous packet transmission, and wherein both systems transmit and receive over the same communication channel, including providing a control coordinator; dividing the TDMA system's frame into sub-frames for use by the CSMA/CA system and the TDMA system; and generating delimiters by the control coordinator to gain, retain and relinquish control of the communication channel from the CSMA/CA system, and wherein the delimiters are transmitted during guard bands of the TDMA system.

13 Claims, 1 Drawing Sheet

METHOD TO PROVIDE BACKWARD COMPATIBILITY WITH AN EXISTING CSMA/CA SYSTEM VIA DUAL USE OF THE NEW SYSTEM'S TRANSMISSION TRANSITION GUARD SLOT INTERVAL

FIELD OF THE INVENTION

This invention relates to local area networks, and specifically to use of CSMA in legacy systems, such as HomePlug® v1.0. (HomePlug® is a registered trademark of the HomePlug Powerline Alliance, Inc.)

BACKGROUND OF THE INVENTION

There are no known systems which provide backward compatibility to the HomePlug® v1.0 system. Background information on the HomePlug® system, which describes the existing system may be found on the HomePlug Powerline Alliance, Inc., website.

U.S. Patent Publication No. 20030156603, of Rakib et al., published Aug. 21, 2003, for Apparatus and method for trellis encoding data for transmission in digital data transmission systems, describes a guard band, or gap, which is reserved for transmission of alignment Barker codes, however, no other data is supposed to be transmitted during the gaps. The guard band is used for a synchronization code for the base station.

EP0622712 B1 of Gee et al., granted Jun. 25, 2003, for Communication network with time coordinated station activity, describes use of a guard band which is located at the end of each periodic interval. When the guard band terminates, a "tone" signal is generated within each node to indicate the temporal boundary between two periodic intervals. Although this signal is not sent over the network, it enables each node to count time in synchronism. An internal tone used for timing in a node is generated but not transmitted.

SUMMARY OF THE INVENTION

A method of providing backwards compatibility of a new TDMA system with an existing CSMA/CA system, wherein the CSMA/CA system includes asynchronous packet transmission, and wherein the TDMA system includes synchronous packet transmission, and wherein both systems transmit and receive over the same communication channel, including providing a control coordinator; dividing the TDMA system's frame into sub-frames for use by the CSMA/CA system and the TDMA system; and generating delimiters by the control coordinator to gain, retain and relinquish control of the communication channel from the CSMA/CA system, and wherein the delimiters are transmitted during guard bands of the TDMA system.

It is an object of the invention to provide a method of backwards compatibility for a TDMA system with an existing CSMA/CA system.

Another object of the invention is to provide for delimiters which are generated by the TDMA system to gain, retain, and relinquish control of the CSMA/CA communication channels.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

This invention provides a method to multiplex an existing Carrier-Sense Multiple Access/Collision Avoidance (CSMA/CA) system with a new Time Divisional Multiple Access (TDMA) system. A unique aspect of the method of the invention is a periodic transmission, generated by the system of the invention, of the existing system's brief "start of packet delimiter" signal, which indicates to the existing system that there is a carrier present and that a long-term back-off should occur. In the method of the invention, a brief delimiter is inserted in the guard band for indicating to the other system that the "carrier" is in use. The generation of the existing system's "start delimiter" occurs during the normally unused time associated with transition from one device in the new system ending its transmissions to another device in the new system beginning its transmissions. The fake "start delimiter" transmission of the method of the invention allows continued operation of the new system during the existing system's back-off intervals.

Another unique aspect of the method of the invention is provision for continuous transmission, generated by the new system, of the existing system's "start of packet delimiter" signal, while a device in the existing system is currently transmitting signals, in order for the new system to initially gain control of the channel capacity from a existing system transmitting device, since the duration of the existing system's packets are not fixed. This continuous transmission, by the new system, of the existing system's "start of packet delimiter" signal, occurs just prior to the time when all devices in the existing system must cease transmissions in favor of the new system. These "start delimiter" signals are eventually heard by the transmitter of the existing system and it, and all other devices in the existing system, will cease transmission for the back-off period. Once the new system has gained control of the channel capacity, it continues to control of the channel capacity by periodically generating additional start delimiters. All devices of the existing system that receive this "start delimiter" infer that a carrier is present and that a long-term back-off should occur.

Another unique aspect of the invention occurs when the duration for the new system's transmissions is over, at which time, a device in the new system sends an existing system's "end delimiter", which indicates to the devices in the existing system that they may contend for channel capacity via the existing systems usual CSMA/CA methods.

1. PLC-AV and HomePlug® 1.0 Compatibility/Coexistence

Overview: Coexistence

Figure 1:
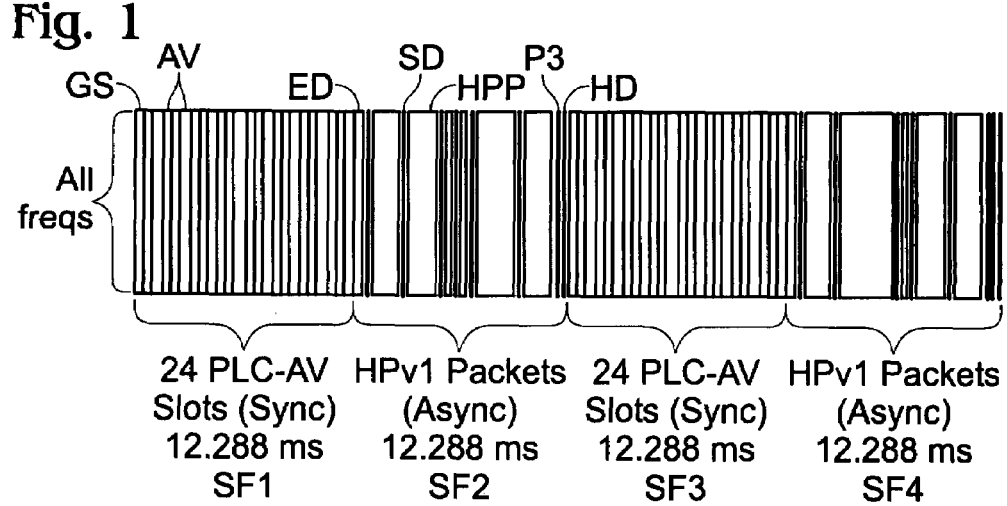
FIG. 1 is a sample of four sub-frames in HPv1 compatibility mode of the method of the invention.

Referring now to FIG. 1, coexistence of Power-Line Carrier-Audio/Visual (PLC-AV) with HomePlug® v1.0 (HPv1), e.g., the ability to share the channel capacity, is provided by a HPv1 compatibility mode that divides a PLC-AV frame into multiple sub-frames, four of which are shown in FIG. 1, which may then be allocated to either HPv1 or PLC-AV under the direction of the PLC-AV central coordinator (CCo). Sub-frames 1-4 are evenly divided between the PLC-AV system and the HPv1 system in this example, however, the sub-frames are not necessarily alternate in occurrence. As shown in the example of FIG. 1, sub-frame 1 is a PLC-AV sub-frame, having twenty-four PLC-AV synchronous slots. In FIG. 1, "GS" represents a guard slot with a HPv1 "hold off delimiter" therein; AV represents a PLC-AV synchronous slot having audio/visual data therein; ED represents a PLC-AV guard slot having a HPv1 "end delimiter" inserted therein by the CCO; SD represents a HPv1 packet having a HPv1 "start delimiter" inserted therein by a HPv1 device; HPP represents a HPv1 packet having an asynchronous priority resolution period therein; P3 represents the highest HPv1 priority, inserted by the CCO to request to regain control of the communication channel; and HO represents a HPv1 "hold off delimiter" inserted by the CCo to signal that control has been taken, Backward Compatibility Incorporating a HPv1chipset into a PLC-AV device (DEV) and ensuring that the CCo supports HPv1 compatibility mode allows the device to perform bridging functions, thereby providing backward compatibility, i.e., the ability for all DEVs on the PLC-AV Network to communicate with HPv1 devices.

PLC-AV Performance

Support for HPv1 coexistence/compatibility in a PLC-AV Network imposes a decrease in PLC-AV system throughput. In HPv1 compatibility mode, PLC-AV eliminates its Frequency Division Multiple Access (FDMA) characteristics and the efficiency associated with simultaneously using the best frequencies for each connection. In order to generate HPv1 delimiters, PLC-AV is forced to provide a guard slot periodically, in this example, every third slot.

The allocation of guard slots directly reduces capacity by one-third with respect to a continuous allocation. Considering guard slots, loss of FDMA and additional losses, such as the increased overhead of shorter bursts, e.g., there is a two slot maximum grouping between guard slots, it is estimated that at least half the PLC-AV channel capacity is consumed in order to provide HPv1 devices an opportunity to access the channel.

Frame Structures

The HPv1 frame varies in size and duration and is asynchronous, whereas the PLC-AV frame structure is of fixed duration and is synchronous. The HPv1 frames carry packets that vary in duration from about 0.5 ms to about 1.5 ms, which is a much shorter duration than the PLC-AV frames. Delimiters identify the beginning and end of each HPv1 packet and are 72 µs in duration. The maximum HPv1 frame size, including delimiters, is an Extended Inter-Frame Space (EIFS), which is equal to the maximum length packet, an associated ACK/NAK, a contention period, a back-off period and intervening guard times of varying length. An HPv1 device is idle for at least the duration of an EIFS (1.695 ms) after seeing a "reserved delimiter" generated by another HPv1 device. Multiple packets may be sent with proper priority, and contention free access is asserted in the delimiters.

PLC-AV Frame Structure Overview

The PLC-AV System defines a frame which is 131 ms in duration and which includes 256 slots and 574 unmasked tones. Each slot is 512 µs long and contains sixteen Orthogonal Frequency Division Multiple Access (OFDM) symbols. A request for a connection between two devices creates a bi-directional channel having of one or more slot-tone sets per frame, wherein a slot-tone set is the set of the tones used during a contiguous set of time slots which carries a burst of data. On any tone, a one-slot guard interval is required to prevent interference during PLC-AV "transitions", which includes changing transmitters, changing from transmit to receive or changing from receive to transmit.

PLC-AV Frame Structure When in Backward HPv1 Capability Mode

Because HomePlug® 1.0 uses asynchronous TDMA (CSMA/CA) and PLC-AV uses fixed slot size TDMA and FDMA methods, there are several issues which must be resolved in order to provide PLC-AV HPv1 compatibly. The ability of the PLC-AV system to take control from HPv1 and return control back to HPv1 is the most critical issue.

For PLC-AV to take control of a HPv1 system and obtain access to the channel capacity, a "hold off" delimiter, which includes a HPv1 reserved delimiter with the highest priority and contention free access asserted, must be sent every 3 PLC-AV slots (~1.5 ms). Effectively, these "hold off" delimiters require an enforced guard slot. The PLC-AV CCo inserts the requisite "hold off" delimiter, which lasts 72 µs, in the middle of the PLC-AV guard slot. Because these enforced guard slots PLC-AV slot (512 µs) must occur every third slot, they interfere with PLC-AV continuity and make it far too complex for the CCo to support Frequency Division Multiplex (FDM). However, they do provide an opportunity to change transmitters, or direction, for PLC-AV, as well as containing a 72 µs HPv1 delimiter. The PLC-AV CCo thus inserts the "hold off" delimiter, which lasts 72 µs, during the middle of each the PLC-AV guard slot.

For HPv1 compatibly, every twenty-four PLC-AV slots (~12.3 ms), the CCo provides an opportunity for a HPv1 device to contend for channel capacity. Thus in the backward compatibly mode, each frame of the PLC-AV system (131 ms) is divided into ten sub-frames of twenty-four PLC-AV slots, each having sixteen slots left over. These sixteen left over slots are allocated, as equally as possible, to the end of each HPv1 sub-frame in order to aid in re-acquiring the capacity for PLC-AV gracefully, e.g., without generating a collision with HPv1 packets. The twenty-four PLC-AV slots include eight PLC-AV transmission opportunities, each of which include two slots for transmission and one slot for transition, e.g., a PLC-AV guard slot.

Operating Mode Details

The PLC-AV system has two operating modes: Normal PLC-AV Mode and HPv1 compatibility mode.

Normal PLC-AV Mode

On power up, or whenever there is a time when all tones are unallocated for over three slots, the CCo monitors for HPv1 delimiters. As long as no signs of HPv1 are found, the normal PLC-AV mode of allocating frequency and time is used, otherwise, HPv1 compatibility mode is used. Whether a HPv1 system is sensed or not, system capacity allocated to HPv1 may be set manually via the CCo.

PLC-AV's HPv1 Compatibility Mode

If PLC-AV's HPv1 compatibility mode is enabled, the CCo time division multiplexes with HPv1 . CSMA/CA access methods are used during HPv1 sub-frames, while fixed length TDMA access methods are used during PLC-AV sub-frames.

Figure 2:
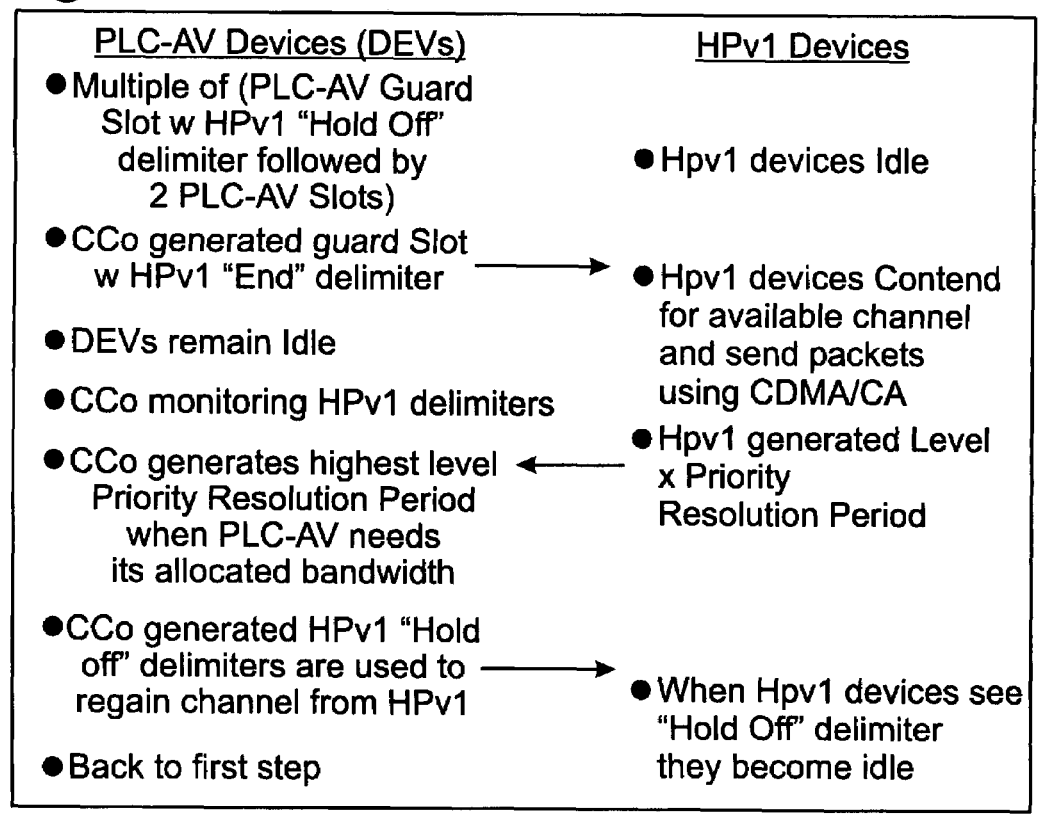
FIG. 2 depicts a sequence of states for PLC-AV and HPv1 devices in HPv1 compatibility mode of the method of the invention.

During HPv1 sub-frames, and any unoccupied HomePlug® PLC-AV sub-frames, the CCo periodically monitors the powerline for HPv1 activity. The method of the invention initiates the following sequence of steps, which are depicted in FIG. 2:

1. PLC-AV DEVs, as allocated by the CCo, generate PLC-AV data for two slots, after which one guard slot is required.
2. During the guard slot the CCo generates the HPv1 "hold off" Delimiter. Reception of delimiters by HPv1 devices is guaranteed if SNR is adequate, i.e., when the desired (delimiter) waveform present at the receiver has a minimum signal power of −35 dBm and is corrupted by Gaussian noise producing a total signal-to-noise power ratio of 0 dB, or less, at the receiver terminal.
3. PLC-AV DEVs repeat steps 1 and 2 a total of eight times, consuming a total of twenty-four slots.
4. Based on the CCo's allocation of capacity to HPv1 and PLC-AV, steps 1 through 3 are repeated for PLC-AV, or control goes to step 5, for HPv1 sub-frames.
5. After the last PLC-AV device in a PLC-AV sub-frame transmits, the CCo generates, in the final guard slot, an HPv1 "end no response" delimiter to free the channel for HPv1 data.
6. HPv1 devices access the powerline for ~24 slots (12.288 ms) while the CCo monitors HPv1 delimiters, until it is time for step 7.
7. When there are fewer than 1.7 ms remaining in the HPv1 sub-frame, the CCo generates HPv1 of the highest priority resolution symbols, and immediately, with no back-off time, generates "hold off" delimiters until time for the initial slot of the next PLC-AV sub-frame. Because HPv1 may contain plural HPv1 packets, the beginning of a burst of HPv1 data near the end of the allotted HPv1 sub-frame is to be expected. Therefore, by generating a continuous sequence of "hold off" delimiters near the end of an HPv1 sub-frame, PLC-AV is able to break into an HPv1 burst at will. The PLC-AV CCo should know, based on the HPv1 packet delimiters context, how much time is left for HPv1 packets on a packet-by-packet basis, as the most time which may be used is EIFS=1.695 ms. The CCo may be adapted to monitor size and modulation of HPv1 transmissions and make some "smart" decisions, e.g., when to send "hold off" delimiters. If, in the end, a high priority HPv1 burst begins, a solution is to jam "hold off" delimiters until the PLC-PLC-AV slots begin and have collisions with HPv1, if that device is not off the line. In HPv1, only two data types are permitted to use the highest priority: control and voice. Generating the highest priority resolution symbols and immediately sending "hold-off" delimiter provides a method to take control of the channel in a timely fashion with minimal collisions with HPv1 packets.
8. Go to step 1.

Thus, A method of providing backwards compatibility of a new TDMA system with an existing CSMA/CA system has been disclosed. It will be appreciated that further variations and modifications thereof may be made within the scope of the invention as defined in the appended claims.

I claim:

1. A method of providing backwards compatibility of a new TDMA system with an existing CSMA/CA system, wherein the CSMA/CA system includes asynchronous packet transmission, and wherein the TDMA system includes synchronous packet transmission, and wherein both systems transmit and receive over the same communication channel, comprising:
   providing a control coordinator;
   dividing the TDMA system's frame into sub-frames for use by the CSMA/CA system and the TDMA system; and
   generating delimiters by the control coordinator to gain, retain and relinquish control of the communication channel from the CSMA/CA system, and wherein the delimiters are transmitted during guard bands of the TDMA system.

2. The method of claim 1 which includes dividing the sub-frames of the TDMA system in guard slots and TDMA slots, wherein each guard slot includes an existing system delimiter.

3. The method of claim 1 which includes inserting a TDMA start delimiter into a guard slot to gain control of the communication channel from the CSMA/CA system.

4. The method of claim 1 which includes inserting a start of packet delimiter to retain continuous control of the communication channel by the TDMA system.

5. The method of claim 1 which includes inserting an end delimiter to relinquish control of the communication channel.

6. A method of providing backwards compatibility of a new TDMA system with an existing CSMA/CA system, wherein the CSMA/CA system includes asynchronous packet transmission, and wherein the TDMA system includes synchronous packet transmission, and wherein both systems transmit and receive over the same communication channel, comprising:
   providing a control coordinator;
   dividing the TDMA system's frame into sub-frames for use by the CSMA/CA system and the TDMA system, including dividing the sub-frames of the TDMA system in guard slots and TDMA slots, wherein each guard slot includes an existing system delimiter; and
   generating delimiters by the control coordinator to gain, retain and relinquish control of the communication channel from the CSMA/CA system, and wherein the delimiters are transmitted during guard bands of the TDMA system.

7. The method of claim 6 which includes inserting a TDMA start delimiter into a guard slot to gain control of the communication channel from the CSMA/CA system.

8. The method of claim 6 which includes inserting a start of packet delimiter to retain continuous control of the communication channel by the TDMA system.

9. The method of claim 6 which includes inserting an end delimiter to relinquish control of the communication channel.

10. A method of providing backwards compatibility of a new TDMA system with an existing CSMA/CA system, wherein the CSMA/CA system includes asynchronous packet transmission, and wherein the TDMA system includes synchronous packet transmission, and wherein both systems transmit and receive over the same communication channel, comprising:
    providing a control coordinator;
    dividing the TDMA system's frame into sub-frames for use by the CSMA/CA system and the TDMA system; and
    generating delimiters by the control coordinator to gain, retain and relinquish control of the communication channel from the CSMA/CA system, and wherein the delimiters are transmitted during guard bands of the TDMA system, including inserting a TDMA start delimiter into a guard slot to gain control of the communication channel from the CSMA/CA system.

11. The method of claim 10 which includes dividing the sub-frames of the TDMA system in guard slots and TDMA slots, wherein each guard slot includes an existing system delimiter.

12. The method of claim 10 which includes inserting a start of packet delimiter to retain continuous control of the communication channel by the TDMA system.

13. The method of claim 10 which includes inserting an end delimiter to relinquish control of the communication channel.

* * * * *